(12) United States Patent
Judd et al.

(10) Patent No.: US 9,478,855 B2
(45) Date of Patent: Oct. 25, 2016

(54) SPACE VEHICLE FIELD UNIT AND GROUND STATION SYSTEM

(71) Applicant: Los Alamos National Security, LLC, Los Alamos, NM (US)

(72) Inventors: Stephen Judd, Los Alamos, NM (US); Nicholas Dallmann, Los Alamos, NM (US); Jerry Delapp, Los Alamos, NM (US); Michael Proicou, Los Alamos, NM (US); Daniel Seitz, Los Alamos, NM (US); John Michel, Santa Fe, NM (US); Donald Enemark, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/745,996

(22) Filed: Jun. 22, 2015

(65) Prior Publication Data
US 2015/0372380 A1 Dec. 24, 2015

Related U.S. Application Data

(60) Provisional application No. 62/016,564, filed on Jun. 24, 2014.

(51) Int. Cl.
*H04B 1/38* (2015.01)
*H04L 5/16* (2006.01)
*H01Q 3/02* (2006.01)
*H04B 7/155* (2006.01)
*H04B 7/185* (2006.01)

(52) U.S. Cl.
CPC ............... *H01Q 3/02* (2013.01); *H04B 7/155* (2013.01); *H04B 7/185* (2013.01)

(58) Field of Classification Search
CPC ......... H01Q 3/02; H04B 7/155; H04B 7/185
USPC ................ 375/219, 220, 221, 222, 295, 316
See application file for complete search history.

(56) References Cited

U.S. PATENT DOCUMENTS

| | | | | |
|---|---|---|---|---|
| 6,985,190 B1* | 1/2006 | Klopfenstein | ........... | H04N 5/50 348/569 |
| 8,554,136 B2* | 10/2013 | McCormack | ............ | H04B 5/02 340/539.1 |
| 9,069,939 B2* | 6/2015 | Wong | ..................... | G06F 21/123 |
| 2005/0245292 A1* | 11/2005 | Bennett | ................ | H04B 1/1615 455/574 |
| 2006/0172707 A1* | 8/2006 | Stern-Berkowitz | ... | H04W 16/18 455/67.11 |
| 2009/0070828 A1* | 3/2009 | Stomakhin | ............. | H04N 7/165 725/68 |

OTHER PUBLICATIONS

Space Micro MSS-01,02 Medium Sun Sensors Brochure, http://www.spacemicro.com/assets/datasheets/guidance-and-nav/MSS.pdf (May 2, 2014).
ESTCube-1 Wikipedia Page, https://en.wikipedia.org/wiki/ESTCube-1 (last accessed Apr. 24, 2014).

* cited by examiner

*Primary Examiner* — Phuong Phu
(74) *Attorney, Agent, or Firm* — LeonardPatel PC

(57) ABSTRACT

A field unit and ground station may use commercial off-the-shelf (COTS) components and share a common architecture, where differences in functionality are governed by software. The field units and ground stations may be easy to deploy, relatively inexpensive, and be relatively easy to operate. A novel file system may be used where datagrams of a file may be stored across multiple drives and/or devices. The datagrams may be received out of order and reassembled at the receiving device.

19 Claims, 20 Drawing Sheets

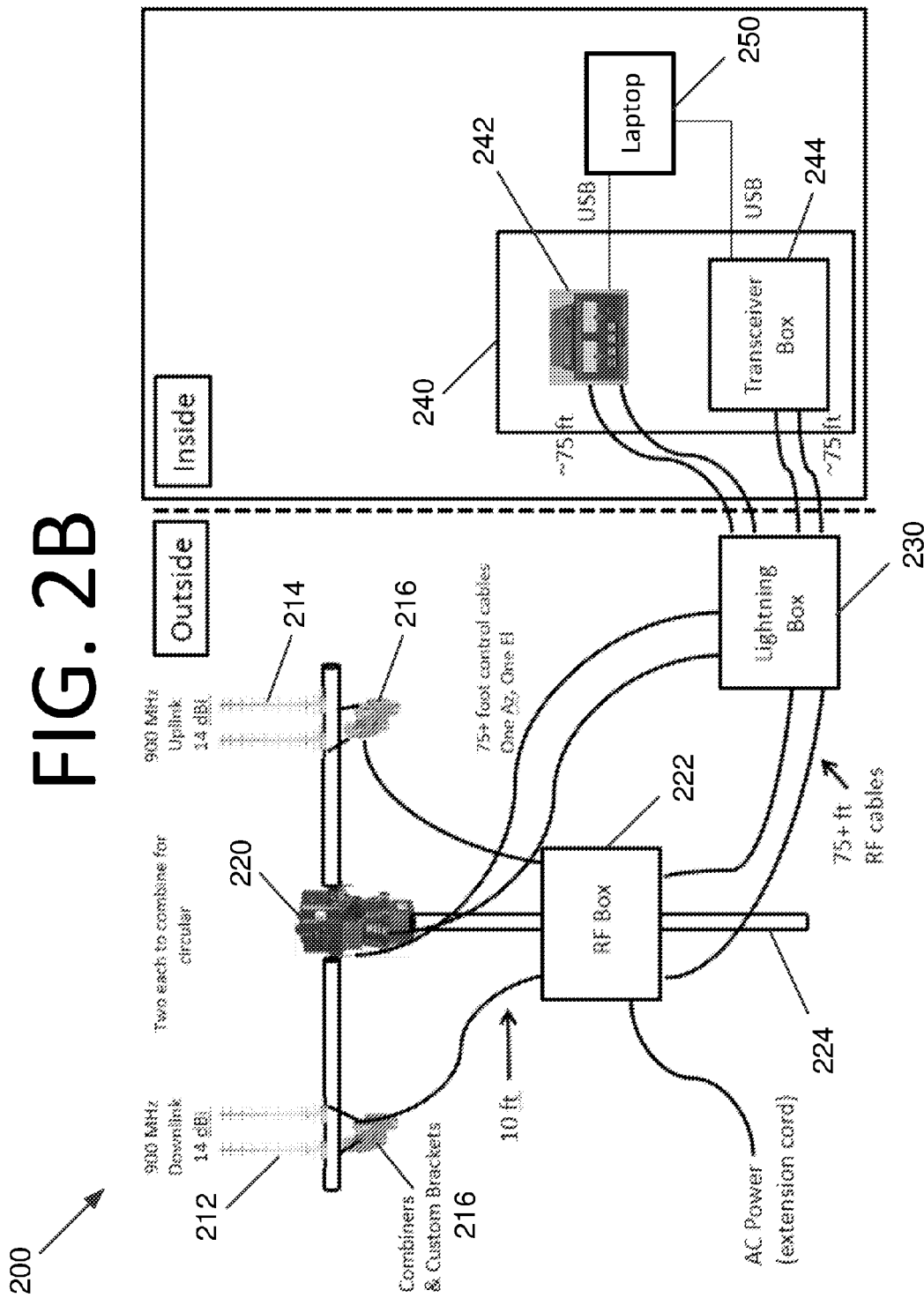

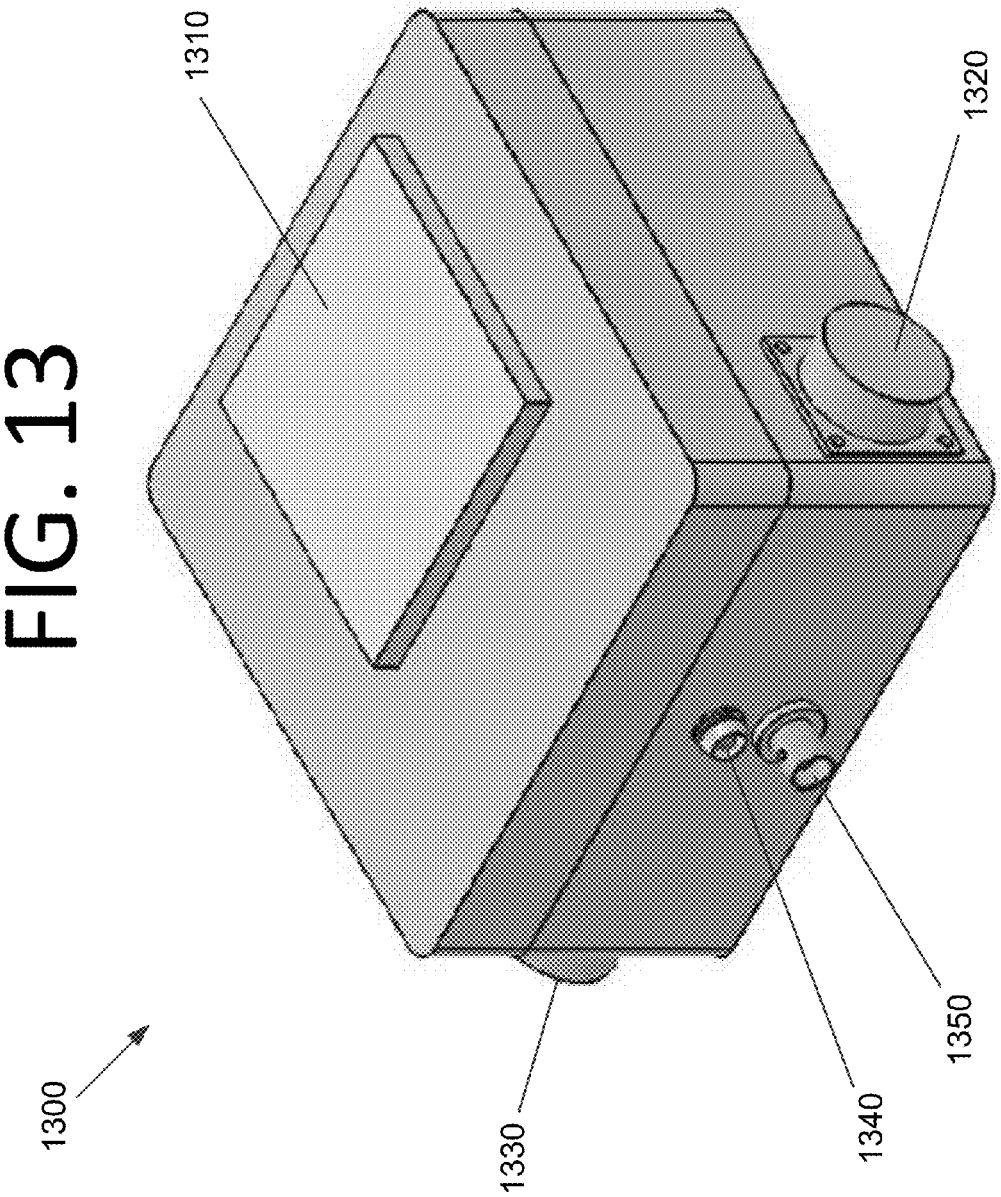

1400

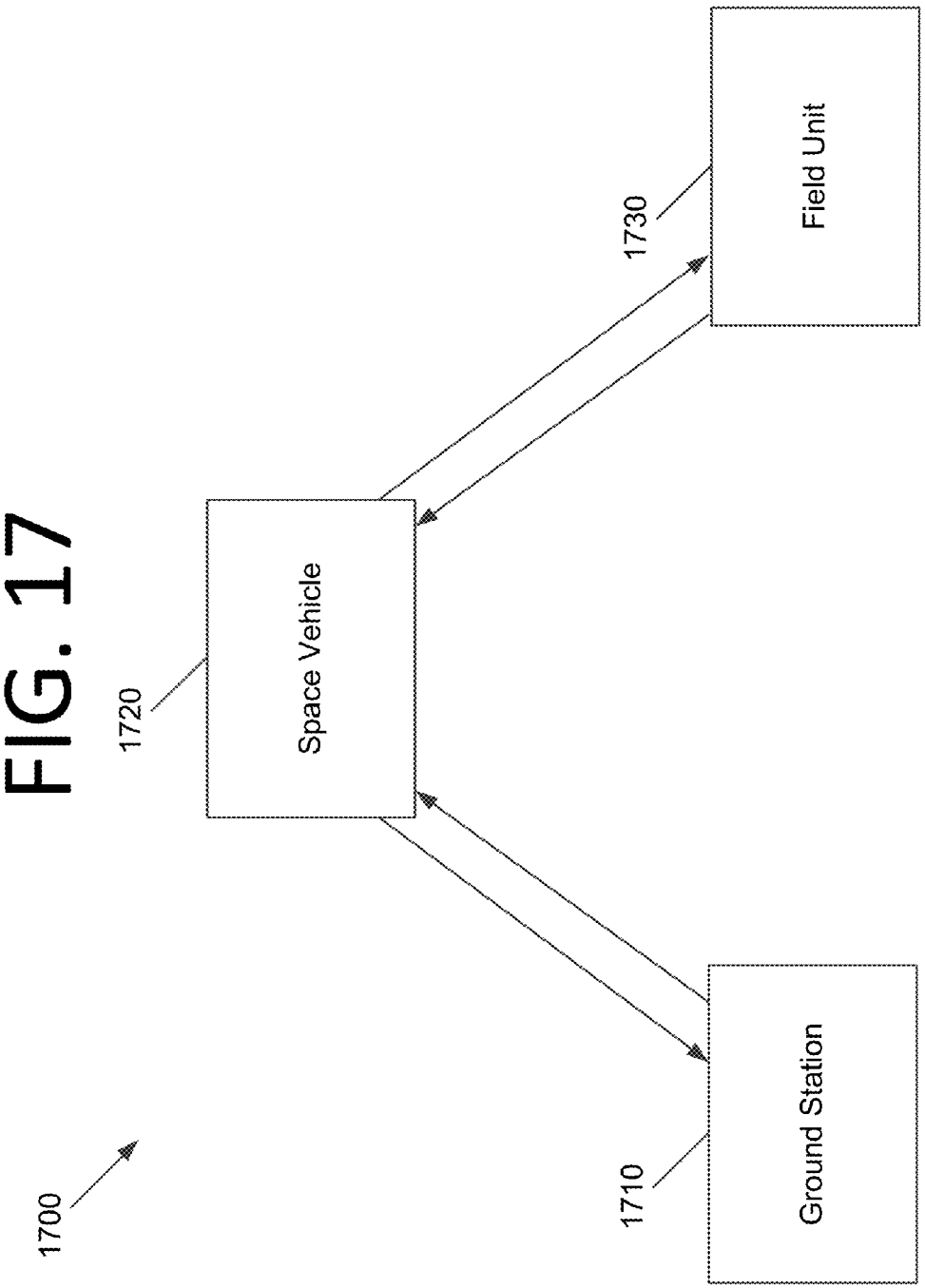

SPACE VEHICLE FIELD UNIT AND GROUND STATION SYSTEM

CROSS REFERENCE TO RELATED APPLICATION

This application claims the benefit of U.S. provisional patent application No. 62/016,564 filed on Jun. 24, 2014. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to a relatively low cost, highly reliable field unit and ground station for a space vehicle that share common components.

BACKGROUND

In conventional field units and ground stations, different system components, designed by a variety of manufacturers, are integrated and used for the field unit and ground station. Also, different software is used for these systems. This adds cost and complexity while reducing reliability. Accordingly, a more cost-effective and reliable field unit and ground station system may be beneficial.

SUMMARY

Certain embodiments of the present invention may provide solutions to the problems and needs in the art that have not yet been fully identified, appreciated, or solved by conventional field unit and ground station systems. For example, some embodiments pertain to a field unit and ground station that use commercial off-the-shelf (COTS) components and share a common architecture, where differences in functionality are governed by software. In certain embodiments, a novel file system is used where frames of a file may be stored across multiple drives and/or devices. The frames may be received out of order and reassembled at the receiving device.

In an embodiment, an apparatus includes at least one hardware board configured to enable operation of the apparatus as a field unit and a ground station. Software controls whether the apparatus operates as a field unit or a ground station without physical modification to the at least one hardware board.

In another embodiment, a field unit/ground station (FU/GS) box includes an analog radio board configured to send and receive radio signals via an antenna. The FU/GS box also includes a digital radio board configured to interface with the analog radio board and provide digital radio functionality. The FU/GS box further includes a microcontroller board configured to provide processing for the FU/GS box and a backplane that connects the analog radio board, digital radio board, and microcontroller board, facilitating communication between the boards. Software controls whether the FU/GS box operates as a field unit or a ground station without physical modification to the boards.

In yet another embodiment, a system includes at least one field unit and at least one ground station. The at least one field unit and the at least one ground station have common hardware.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 2A and 2B are architectural diagrams illustrating a ground station, according to an embodiment of the present invention.

FIG. 13 is a perspective view illustrating a field unit box, according to an embodiment of the present invention.

FIG. 17 is a block diagram illustrating connection setup for a ground station, space vehicle, and field unit system, according to an embodiment of the present invention.

DETAILED DESCRIPTION OF THE EMBODIMENTS

Some embodiments of the present invention pertain to a relatively low cost field unit and ground station system that use the same boards and reuse the majority of the software. The field unit and ground station may use commercial off the shelf (COTS) components and have a relatively simple software interface. The system may be highly reliable, operating for extended periods of time. The system may also be highly optimized for a wide variety of missions to improve performance and lower costs. In other words, the field unit and ground station may be readily adaptable to a wide range of missions "out of the box," and the principal hardware may be fully commoditized. The ground station may be a fully Internet-capable control station that can facilitate user-defined, user-controlled custom space solutions. In certain embodiments, the user community may have full control of the system via software, hardware, ease of use, and wide adoption.

Figure 1:
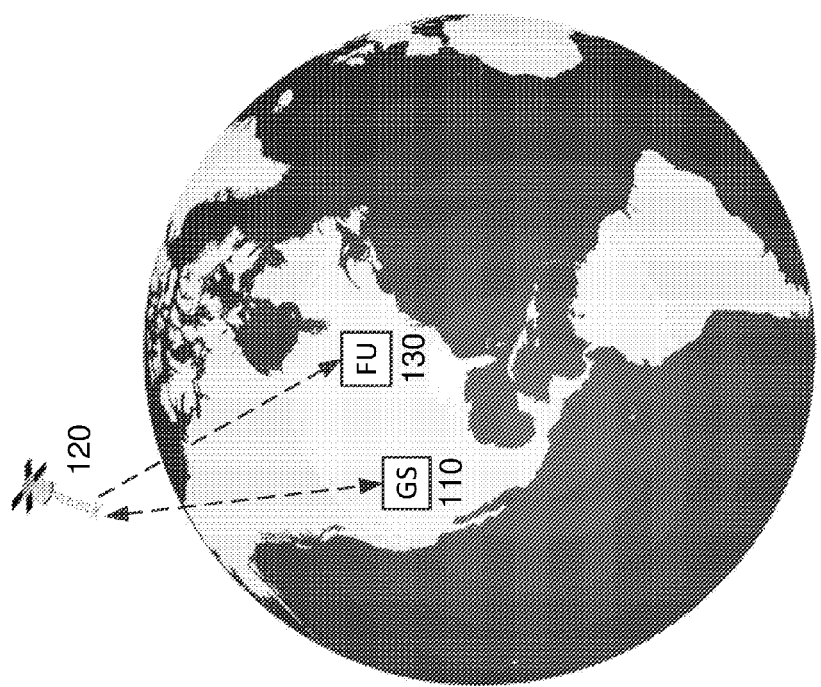
FIG. 1 is a perspective view illustrating a deployed space vehicle system, according to an embodiment of the present invention.

FIG. 1 is a perspective view illustrating a deployed space vehicle system 100, according to an embodiment of the present invention. System 100 includes a ground station 110, a space vehicle 120, and a field unit 130. In some embodiments, there may be multiple ground stations, multiple field units, multiple space vehicles, or any combination thereof. Furthermore, in some embodiments, space vehicles may communicate with one another and/or be individually customized to perform different missions or to have different capabilities in order to create a space vehicle "swarm" that has more capabilities than any individual space vehicle.

Ground station 110 provides command and control capabilities for space vehicle 120 using two-way communication and for field unit 130 using the satellite as a relay. Space vehicle 120 may collect data in accordance with its mission and transmit the data to ground station 110. In some embodiments, field unit 130 collects data, space vehicle 120 collects the data from field unit 130, and space vehicle 120 relays the data to ground station 110. In certain embodiments, ground station 110 transfers data to space vehicle 120, and space vehicle 120 transfers the data to field unit 130 at a later time. In some embodiments, ground station 110 communicates with field unit 130 in real time or near-real time, using space vehicle 120 as a relay.

Ground Station and Field Unit

Figure 2A:
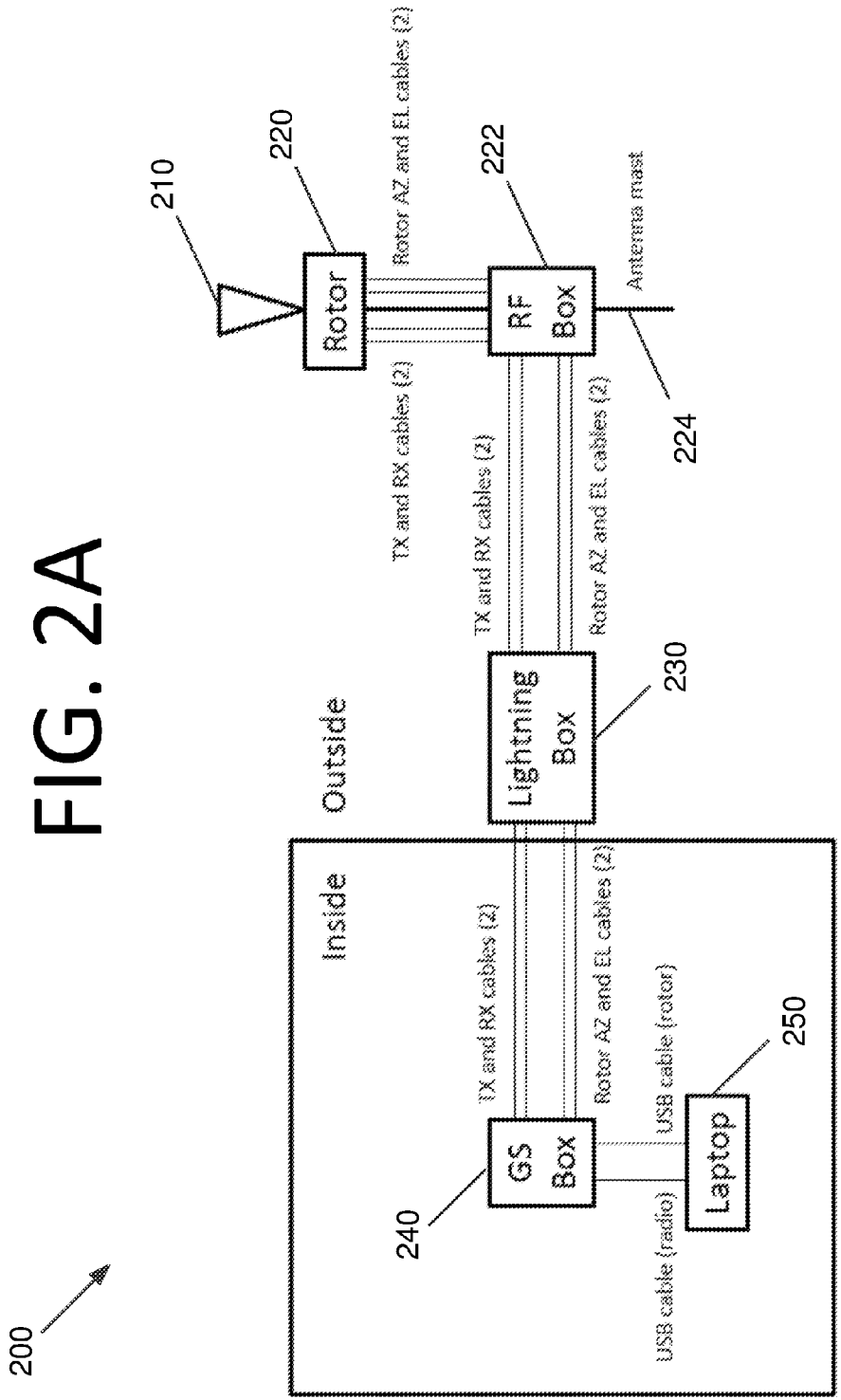

FIGS. 2A and 2B are architectural diagrams illustrating a ground station 200, according to an embodiment of the present invention. An antenna 210 is configured to facilitate two-way communication with space vehicles. Antenna 210 includes downlink antennas 212 and uplink antennas 214. Downlink antennas 212 and uplink antennas 214 each operate at a frequency of 915 megahertz (MHz) with a gain of 14 decibels-isotropic (dBi). Using two downlink antennas 212 and uplink antennas 214 enables circular polarization. Combiners and custom brackets 216 fasten downlink antennas 212 and uplink antennas 214 to antenna 210.

A rotor 220 moves antenna 210 to facilitate better reception. An RF box 222 allows long cable runs and sends signals to and receives signals from antenna 210. A mast 224 holds antenna 210, rotor 220, and RF box 222 in an upright position. Transmitting (TX) and receiving (RX) cables and rotor azimuth (AZ) and elevation (EL) cables run between, and connect, rotor 220 and RF box 222.

A lightning box 230 is connected to RF box 222 via antenna TX and RX cables and rotor AZ and EL cables. Lightning box 230 is grounded and protects other connected electronics from current surges due to lightning strikes. Lightning box 230 is also connected to a ground station (GS) box 240 via antenna TX and RX cables and rotor AZ and EL cables. In some embodiments, these cables may be hundreds of feet long or more.

GS box 240 may be rugged, relatively easy to use, and be run from a standard personal computer, tablet computer, mobile phone, or any other suitable computing device, such as laptop 250. Antenna 210, rotor 220, RF box 222, mast 224, lightning box 230, and GS box 240 may be compact and portable, allowing deployment in many locations. In certain embodiments, multiple computing systems may be used to control ground station 200.

GS box 240, which is controlled by laptop 250, controls the orientation of antenna 210 via rotor control box 242 and sends data to/receives data from the space vehicle via transceiver box 244. GS box 240 also contains sensitive electronics and cryptographic keys for communication. In some embodiments, GS box 240 may be attached to antenna 210 or integrated with rotor 220 itself. In such embodiments, laptop 250, or any other suitable computing device, may communicate remotely with GS box 240. In such embodiments, a user may potentially control the operation of ground station 200 from any desired location. Laptop computer 250 communicates with GS box 240 to send communication data to space vehicles, receive digital space vehicle communication data, and control the orientation of antenna 210 via rotor 220.

Figure 3:
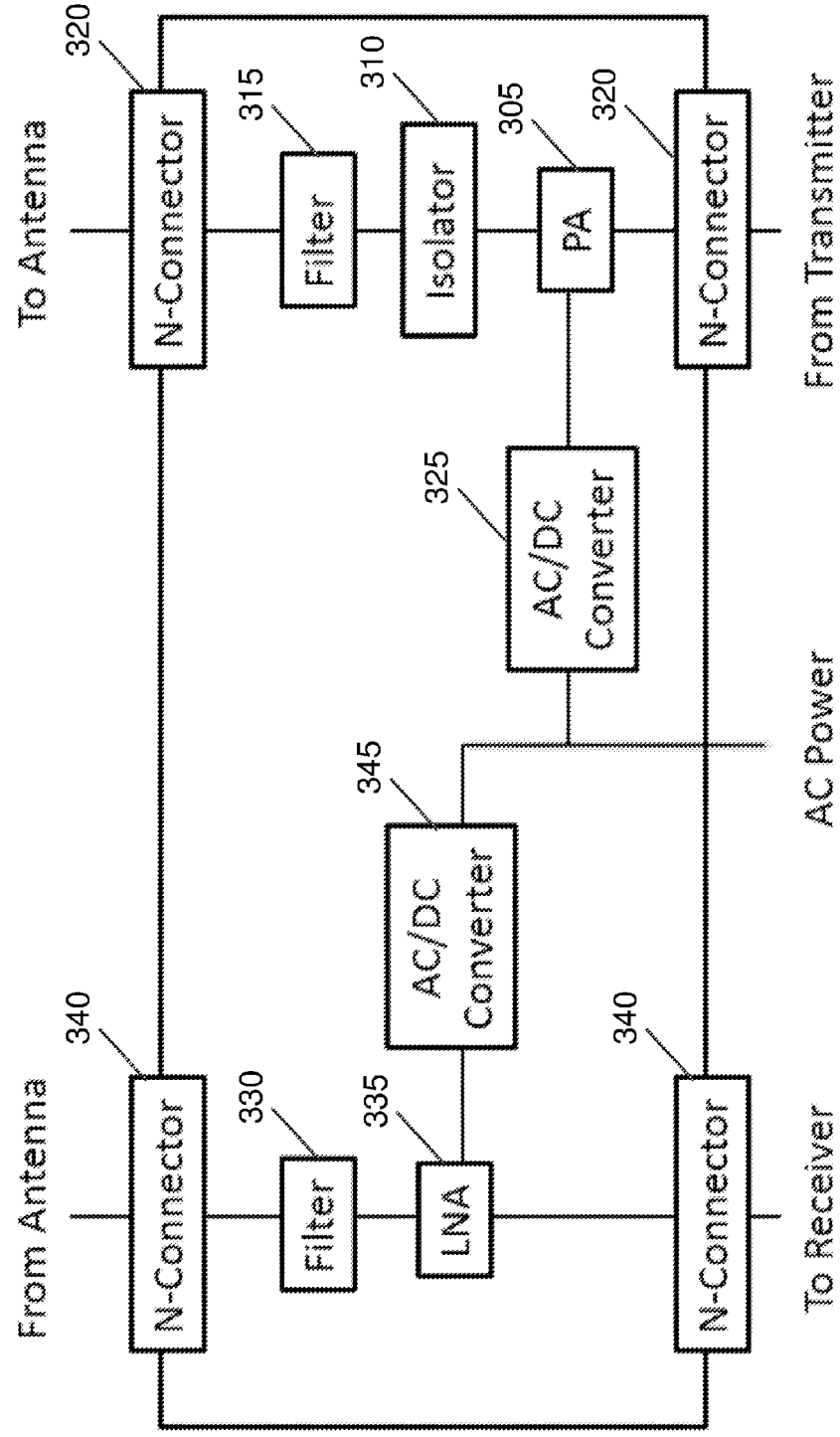
FIG. 3 is a block diagram illustrating an RF box, according to an embodiment of the present invention.

FIG. 3 is a block diagram illustrating an RF box 300, according to an embodiment of the present invention. RF box 300 includes a transmit and receive chain to provide amplification in order to enable long cable runs between the ground station box and the antennas, and is placed near the antennas. RF box 300 may be powered by AC wall power to simplify setup. The transmit chain includes a power amplifier (PA) 305, an isolator 310, a filter 315, and appropriate RF cable connectors (N-connectors 320), using an AC/DC power converter 325 to power PA 305. The receive chain includes a filter 330, a low noise amplifier (LNA) 335, and appropriate RF cable connectors (N-connectors 340), using an AC/DC power converter 345 to power LNA 335.

Figure 4:
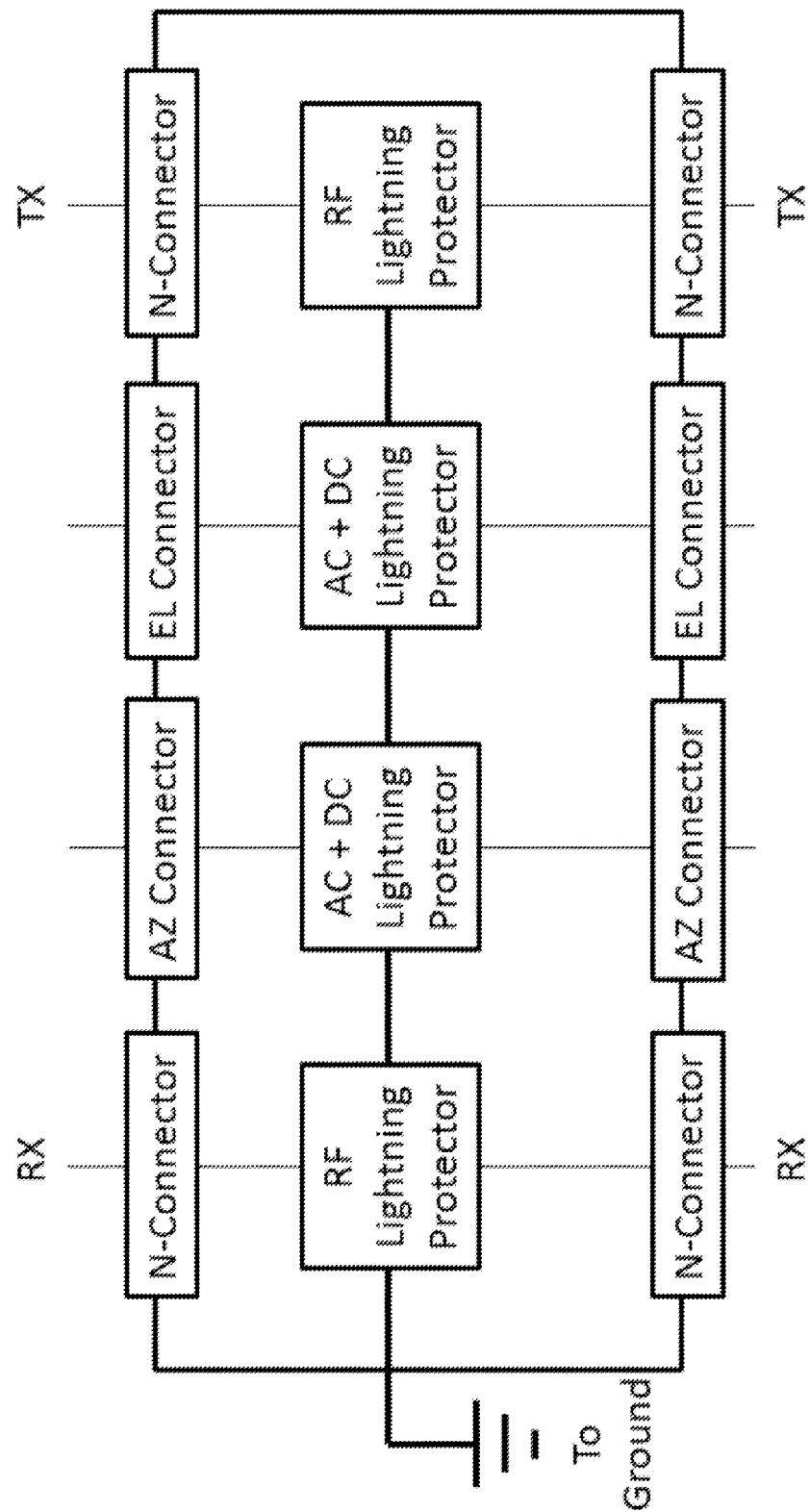
FIG. 4 is a photograph illustrating a prototype RF box, according to an embodiment of the present invention.

FIG. 4 is a photograph illustrating a prototype RF box 400, according to an embodiment of the present invention. In RF box 400, the filters, LNA, and PA are visible. RF box 400 has a rugged, weatherproof, fully enclosed outdoor case that houses the sensitive electronics inside.

Figure 5:
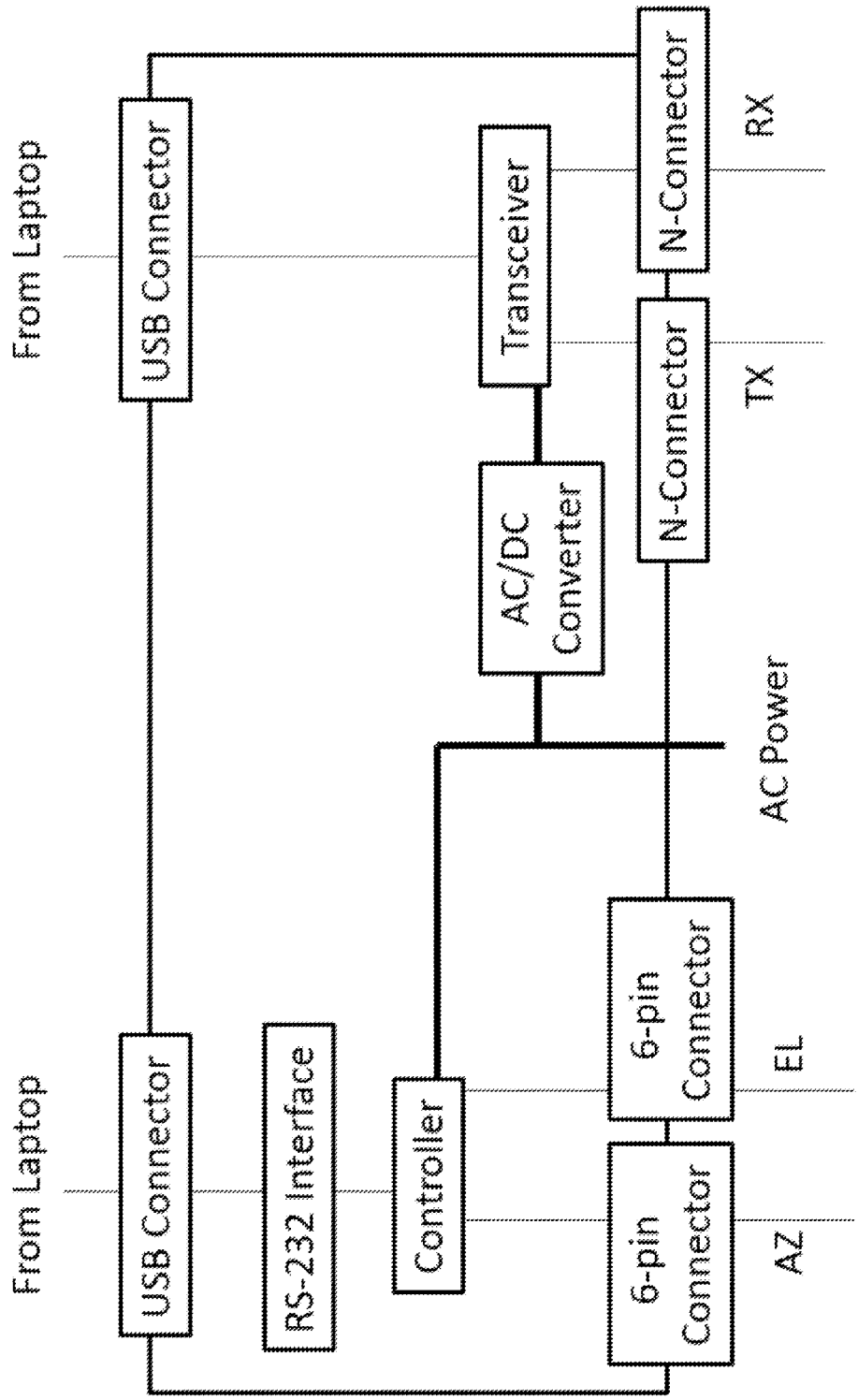
FIG. 5 is a block diagram illustrating a lightning box, according to an embodiment of the present invention.

FIG. 5 is a block diagram illustrating a lightning box 500, according to an embodiment of the present invention. Lightning box 500 provides protection for the RF transmit and receive signal paths and the rotor control signal paths. For RF protection, a standard RF lightning protector may be used. For rotor control protection, separate AC and DC paths may be provided to accommodate both types of signals using standard AC and DC lightning protection approaches.

Figure 6:
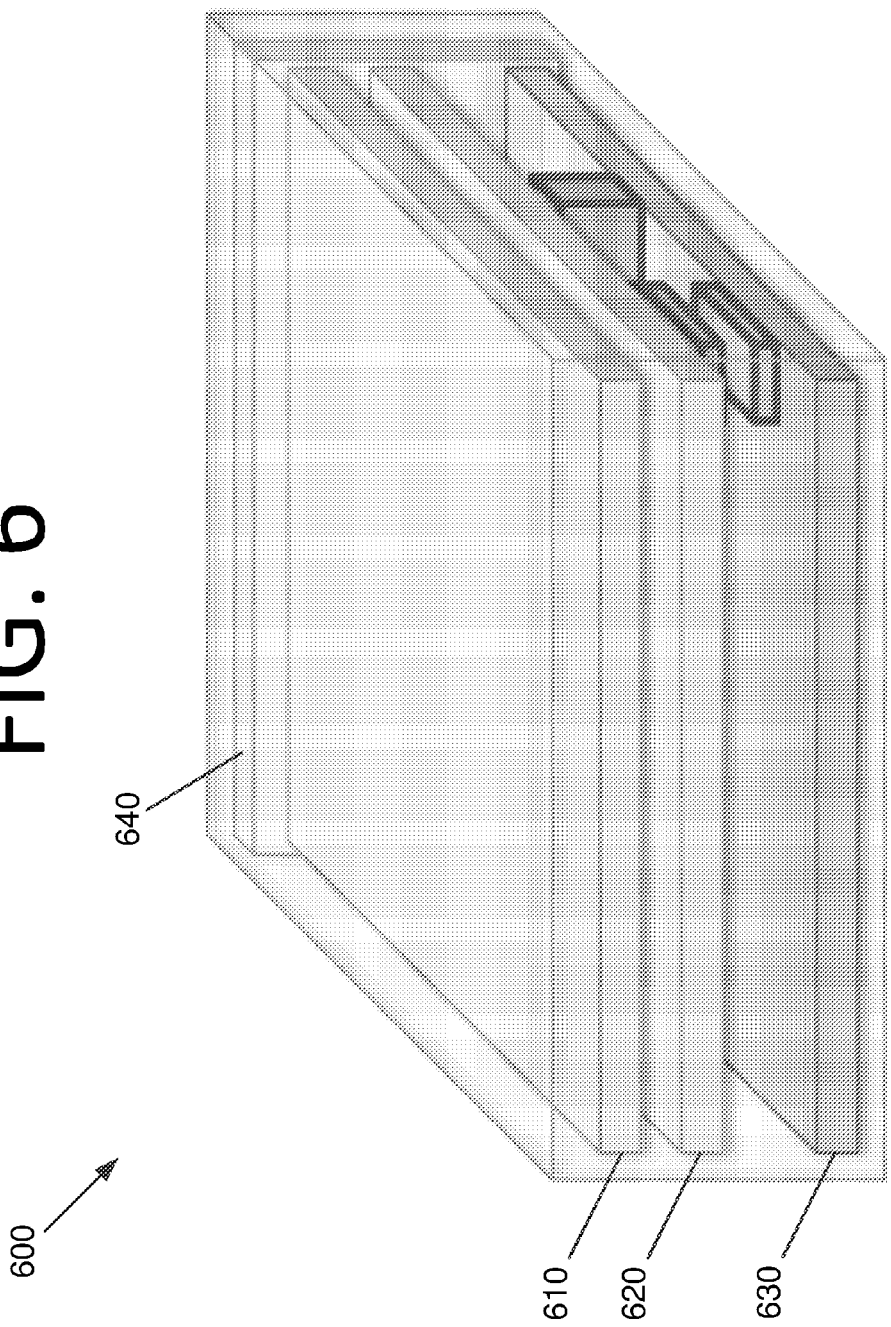
FIG. 6 is a photograph illustrating a prototype lightning box, according to an embodiment of the present invention.

FIG. 6 is a photograph illustrating a prototype lightning box 600, according to an embodiment of the present invention. Lightning box 600 has a rugged case that houses internal electronics.

Figure 7:
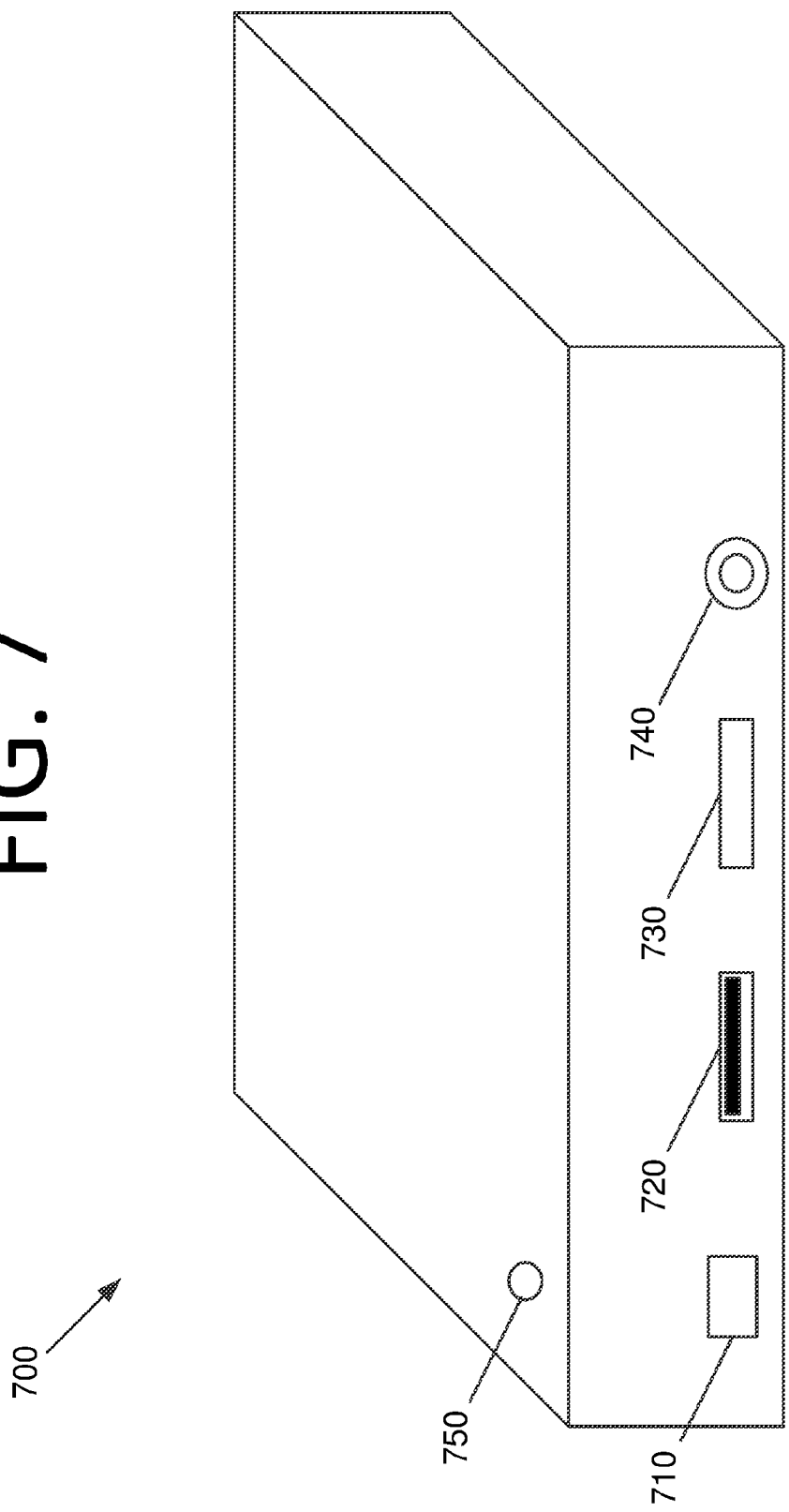
FIG. 7 is a block diagram illustrating a ground station (GS) box, according to an embodiment of the present invention.

FIG. 7 is a block diagram illustrating a GS box 700, according to an embodiment of the present invention. GS box 700 houses the satellite radio and antenna rotor controllers. The rotor controller may be accessed by connecting GS box 700 to a computer using a USB cable. A USB-to-RS-232 converter may be used to interface to the rotor controller. Custom bayonet/screw-on connectors may be provided on the outside of GS box 700 to enable ground station setup without requiring tools. The controller may be powered by standard AC wall power. The satellite radio transceiver may be accessed by connecting GS box 700 to a computer using a USB cable, and may be powered by a standard AC/DC converter. The radio of GS box 700 may be identical to the radio used on the space vehicle. Standard RF coaxial connectors may be provided for the transmit and receive signal paths, enabling ground station setup without requiring tools.

Figure 8:
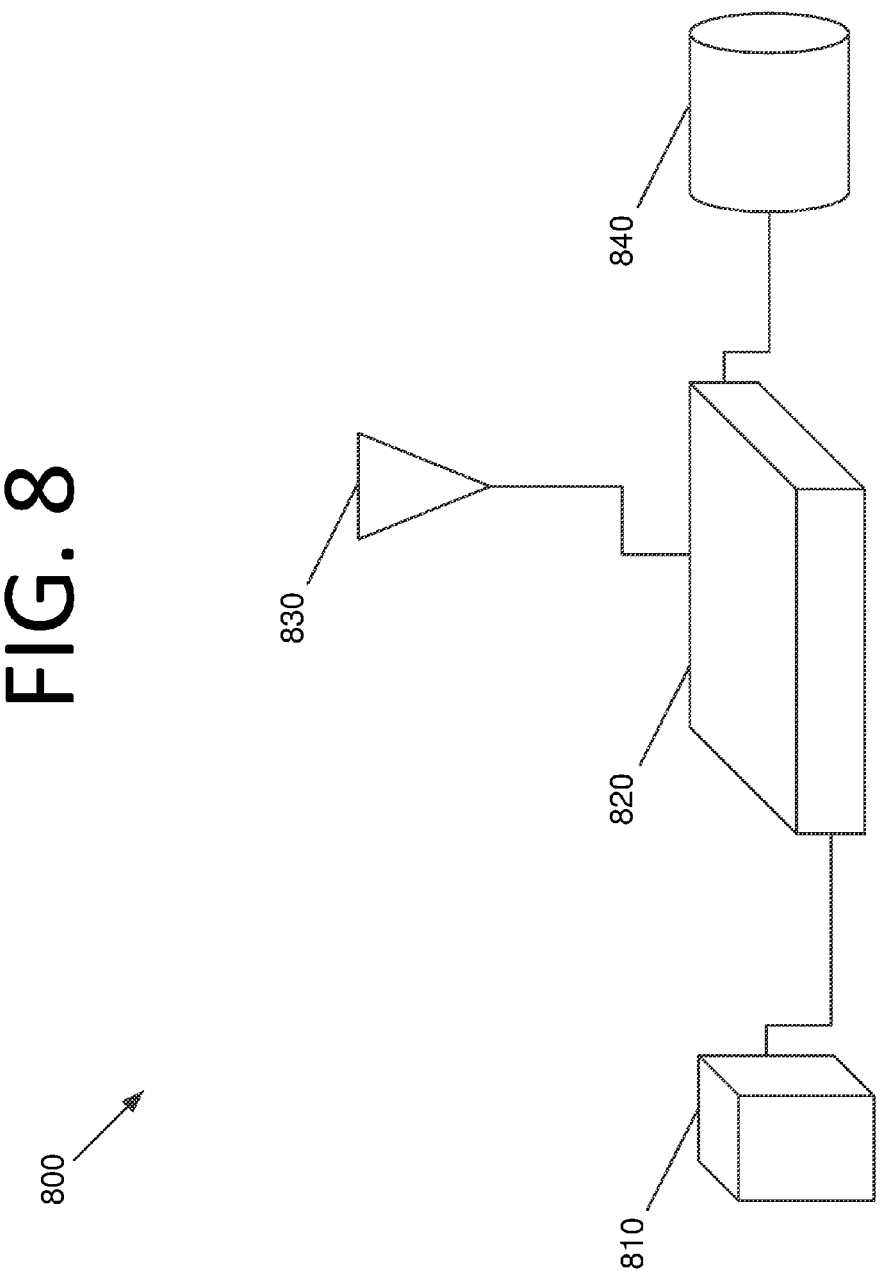
FIG. 8 is a photograph illustrating a prototype GS box, according to an embodiment of the present invention.

FIG. 8 is a photograph illustrating a prototype GS box 800, according to an embodiment of the present invention. GS box 800 has a rugged case that houses sensitive internal electronics. GS box 800 enables control of antenna orientation and facilitates communication with space vehicles via the antenna.

Figure 9:
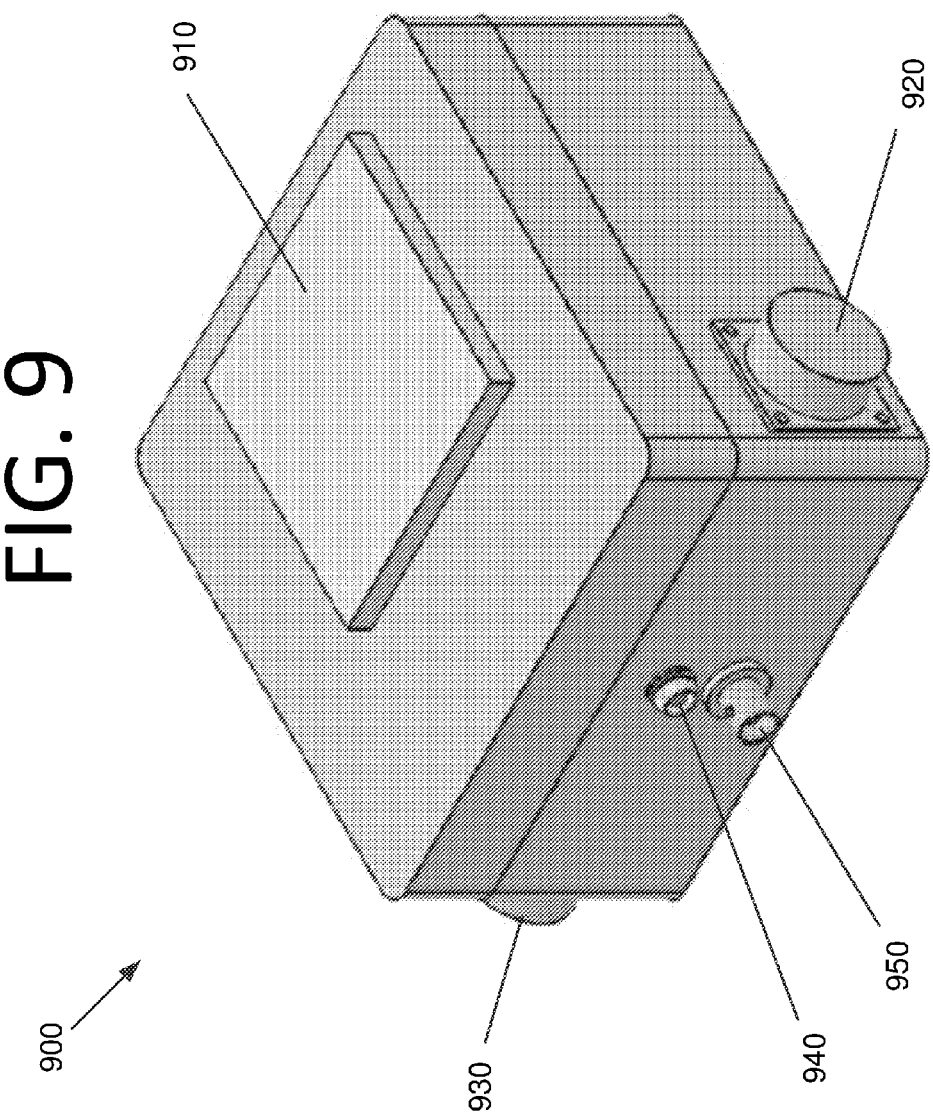
FIG. 9 is a photograph illustrating a prototype ground station antenna assembly, according to an embodiment of the present invention.

FIG. 9 is a photograph illustrating a prototype ground station antenna assembly 900, according to an embodiment of the present invention. In antenna assembly 900, separate antennas are used for transmission and reception, and antenna pairs are used for each to enable circular polarization. As can be seen, antenna assembly 900 is relatively compact, enabling deployment in a large variety of operating environments. The RF box is visible next to the antenna.

An advantage of some embodiments is that they can be built using COTS parts, including the rotor, antennas, ground station box boards, controlling computer, etc. The system may only cost a few thousand dollars in some embodiments. The system may also be deployable in non-pristine environments. In a poor conditions test in a snowy environment, the prototype system performed normally.

Figure 10:
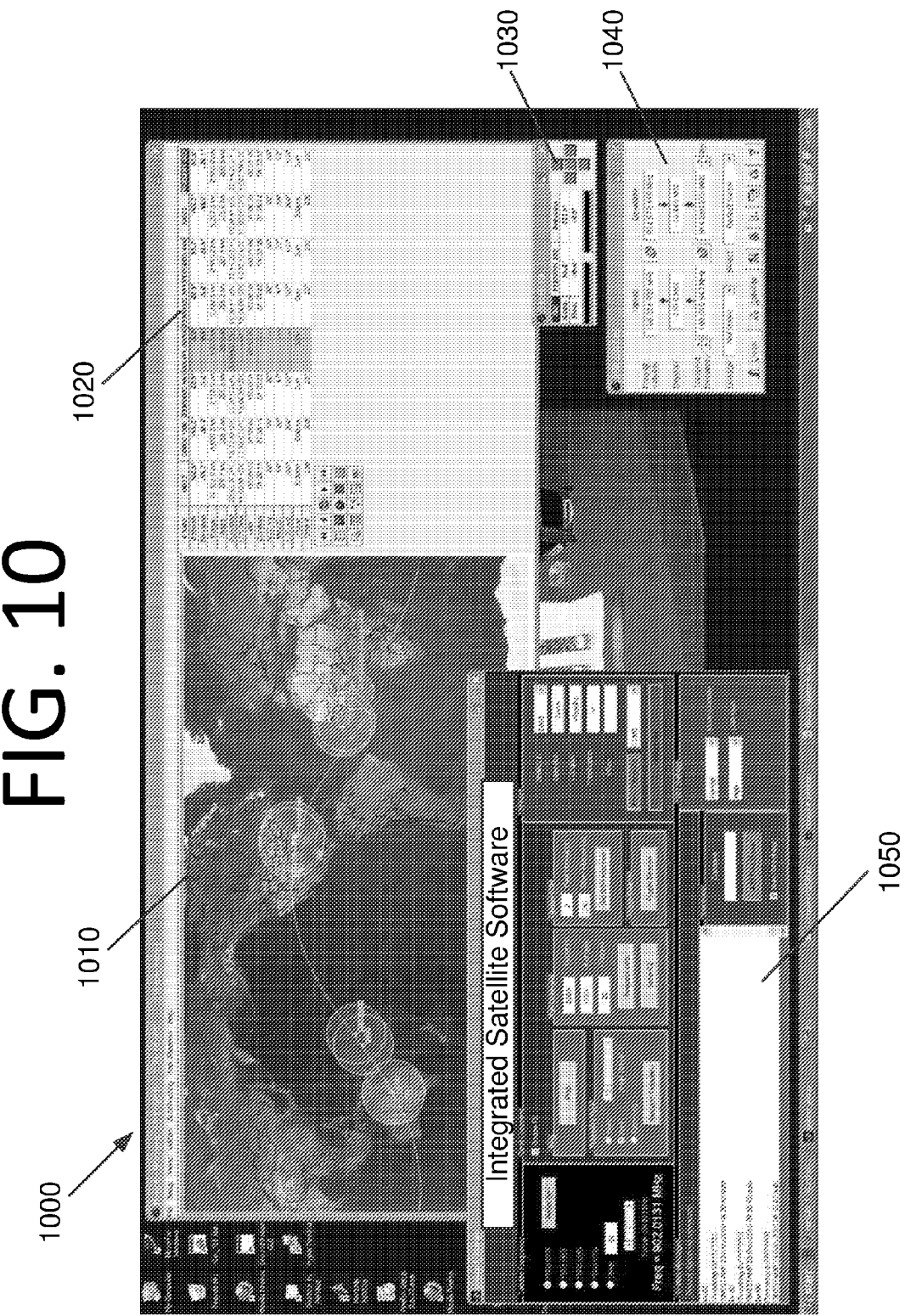
FIG. 10 is a perspective view illustrating the inside of a ground station/field unit box, according to an embodiment of the present invention.

FIG. 10 is a perspective view illustrating the inside of a ground station/field unit (GS/FU) box 1000, according to an embodiment of the present invention. GS/FU box 1000 includes an analog radio board 1010 that sends and receives radio signals via an antenna (not shown). A digital radio board 1020 interfaces with analog radio board 1010 and provides digital radio functionality. GS/FU box 1000 achieves higher data rates than other satellite communication systems relative to the size and power consumption. A microcontroller board 1030, such as a Linux™ single board computer (SBC), e.g., Beagleboard™, provides processing for GS/FU box 1000. A backplane 1040 connects the boards, facilitating communication therebetween, and also connects to a power supply (not shown). In some embodiments, the dimensions are approximately 4×4×2 inches. In certain embodiments, all functionality may be achieved with, and performed by, a single board.

Some embodiments may have various ports, such as universal serial bus (USB), Ethernet, power ports, an external antenna connector, etc. In certain embodiments, the ports of GS/FU box 1000 may be exposed. In such embodiments, a protective enclosure that shields GS/FU box 1000 from the elements should be used. The protective enclosure may include a casing protecting GS/FU box 1000 from weather, vents, cooling fans, etc.

Figure 11:
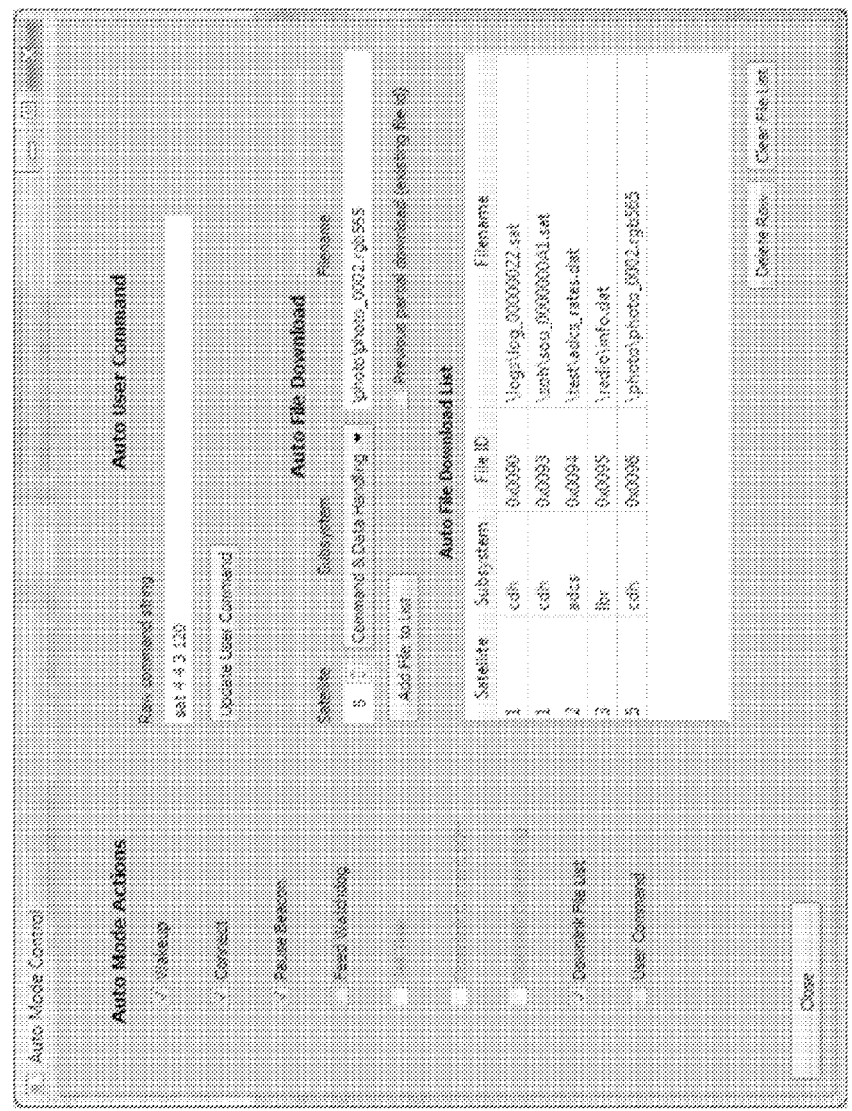
FIG. 11 is a perspective view illustrating a ground station/field unit box, according to an embodiment of the present invention.

FIG. 11 is a perspective view illustrating a GS/FU box 1100, according to an embodiment of the present invention. GS/FU box 1100 includes a CATS port 1110, a USB port 1120, a general purpose input/output (GPIO) port 1130, and an N-connector port 1140 for receiving a radio frequency (RF) signal. A light emitting diode (LED) power indicator 1150 indicates whether GS/FU box 1100 is on and has power.

Per the above, a common box may be used for deployment in a ground station or a field unit in some embodiments. In certain embodiments, the logic enabling ground station functionality, field unit functionality, or both may be stored on a storage device, such as a secure digital (SD) card, a flash drive, or any other storage device that may be plugged into the GS/FU box, which may then read and executes the code. In some embodiments, code containing the logic may be downloaded by the GS/FU box via a wired or wireless connection. Encryption keys may also be stored on the storage device or downloaded from a remote computing system. This may enable certain security privileges on a per-user basis (e.g., administrator, user, etc.).

Figure 12:
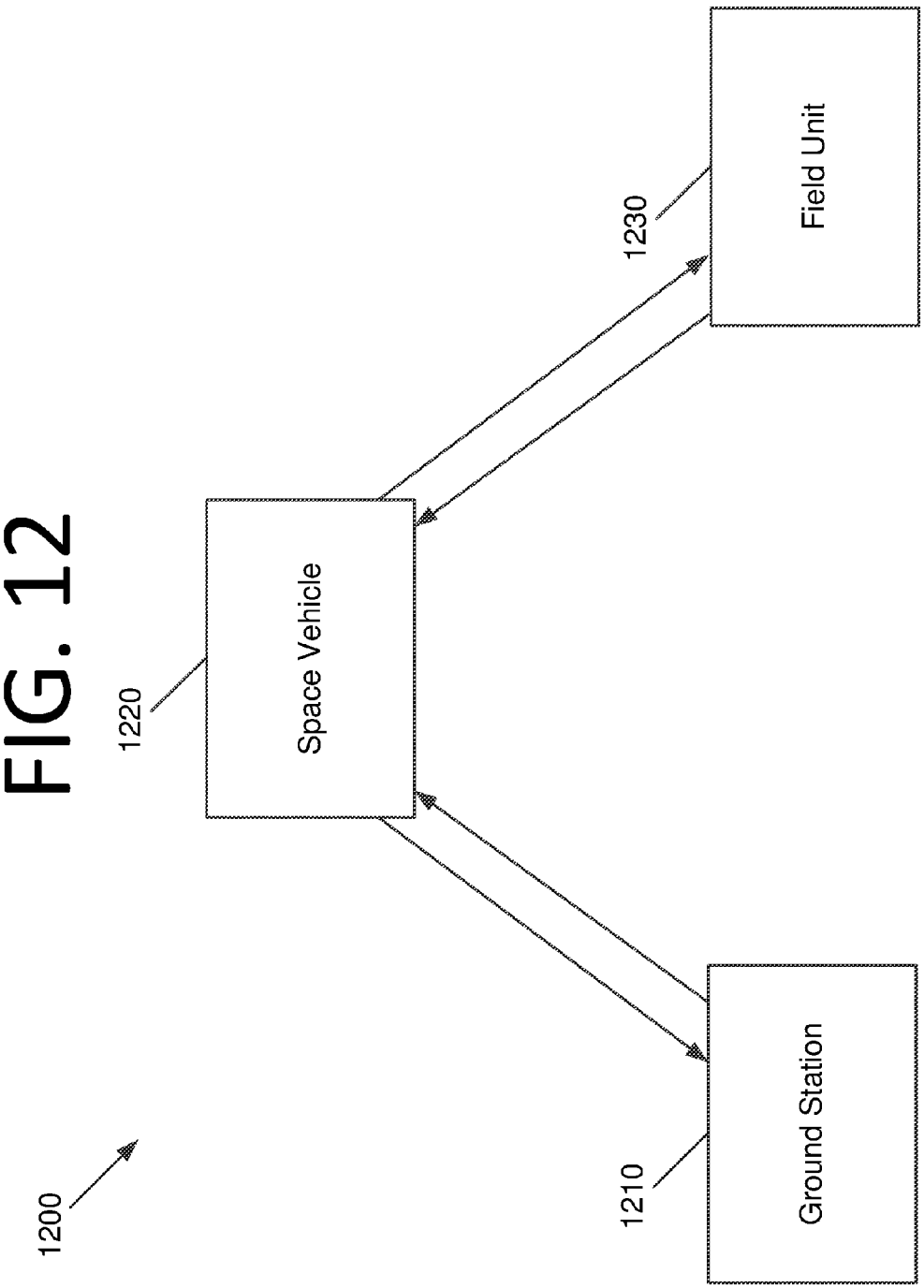
FIG. 12 is an architectural diagram illustrating a field unit system, according to an embodiment of the present invention.

FIG. 12 is an architectural diagram illustrating a field unit system 1200, according to an embodiment of the present invention. A direct current (DC) power supply 1210 provides power to a field unit box 1220. In some embodiments, alternating current (AC) power may be used instead of DC power. Field unit box 1220 communicates with one or more space vehicles via an antenna 1230. In some embodiments, field unit 1220 may only receive data from space vehicles and may not transmit data, or may lack transmission capabilities. A sensor 1240 is connected to field unit box 1220. In this embodiment, field unit box 1220 serves as a modem to relay data taken by sensor 1240 back to a ground station, or to allow the ground station to command sensor 1240.

In some embodiments, deployment of field unit system 1200 may be relatively easy and not require special expertise. For instance, in some embodiments, a user may plug sensor 1240 into field unit box 1220, plug antenna 1230 into field unit box 1220, position antenna 1230, plug DC power supply 1210 into field unit box 1220, and walk away. This ease of deployment is not possible with conventional field unit systems.

FIG. 13 is a perspective view illustrating a field unit box 1300, according to an embodiment of the present invention. Field unit box 1300 includes a patch antenna 1310 that enables field unit 1300 to uplink data from external sources, such as data detected by sensors attached to RJ45 Ethernet interface 1320, to a space vehicle. Communications may use any desired authentication and encryption format, such as NSA Suite B. Field unit 1300 also includes a USB interface 1330, an RGB LED 1340 that indicates field unit status, and a power jack 1350, which may have a wide power supply range. Field unit 1300 may share at least some common hardware and software with a space vehicle and ground station in some embodiments.

Figure 14A:
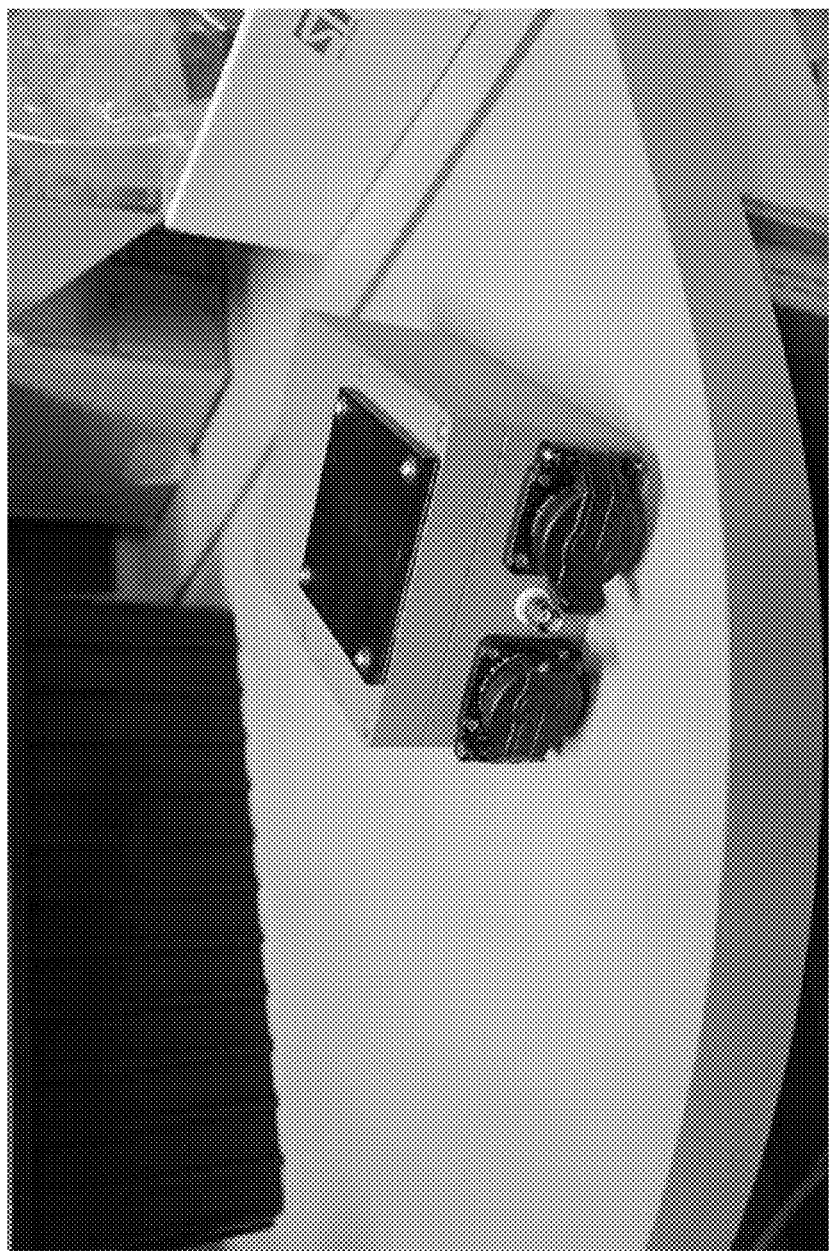
FIG. 14A is a photograph illustrating a closed field unit box, according to an embodiment of the present invention.
Figure 14B:
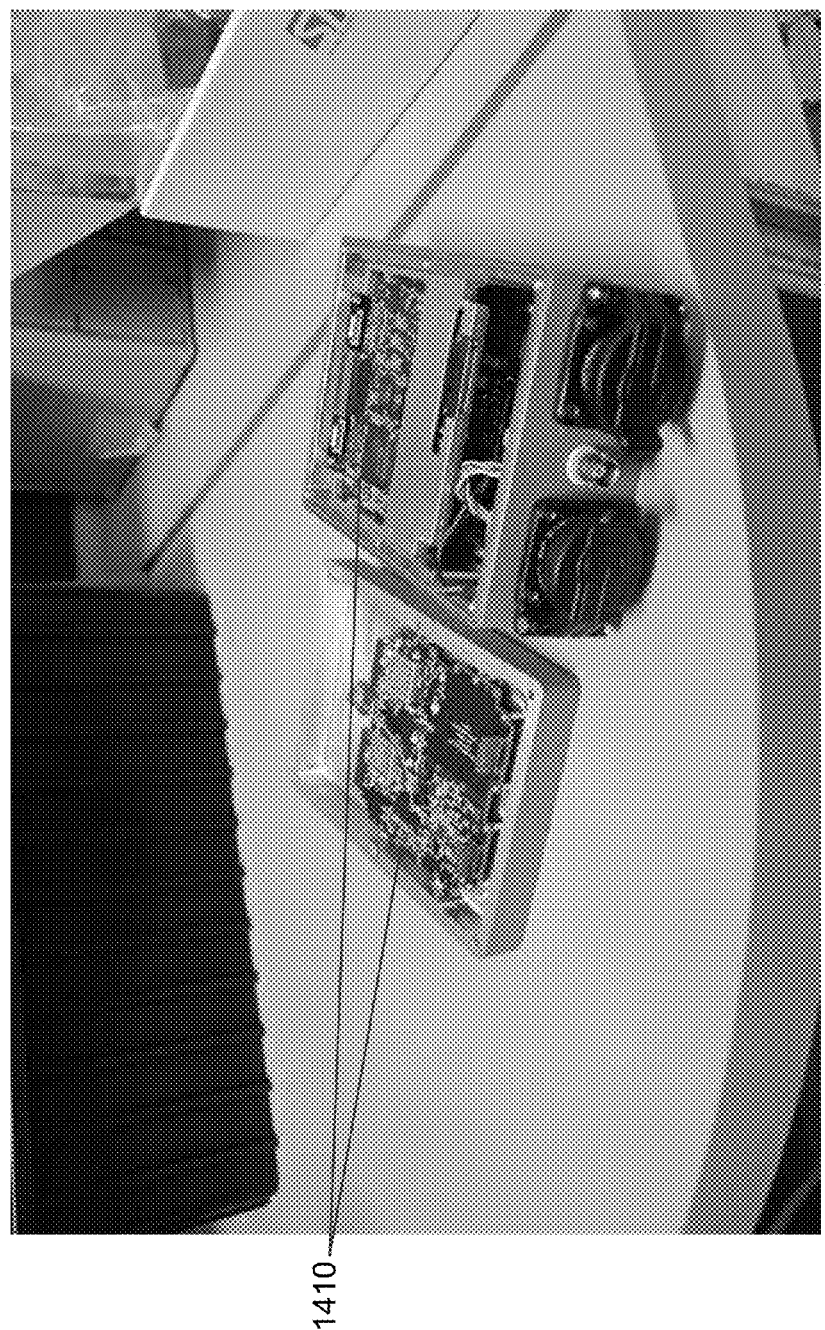
FIG. 14B is a photograph illustrating the field unit box with an open case, according to an embodiment of the present invention.
Figure 14C:
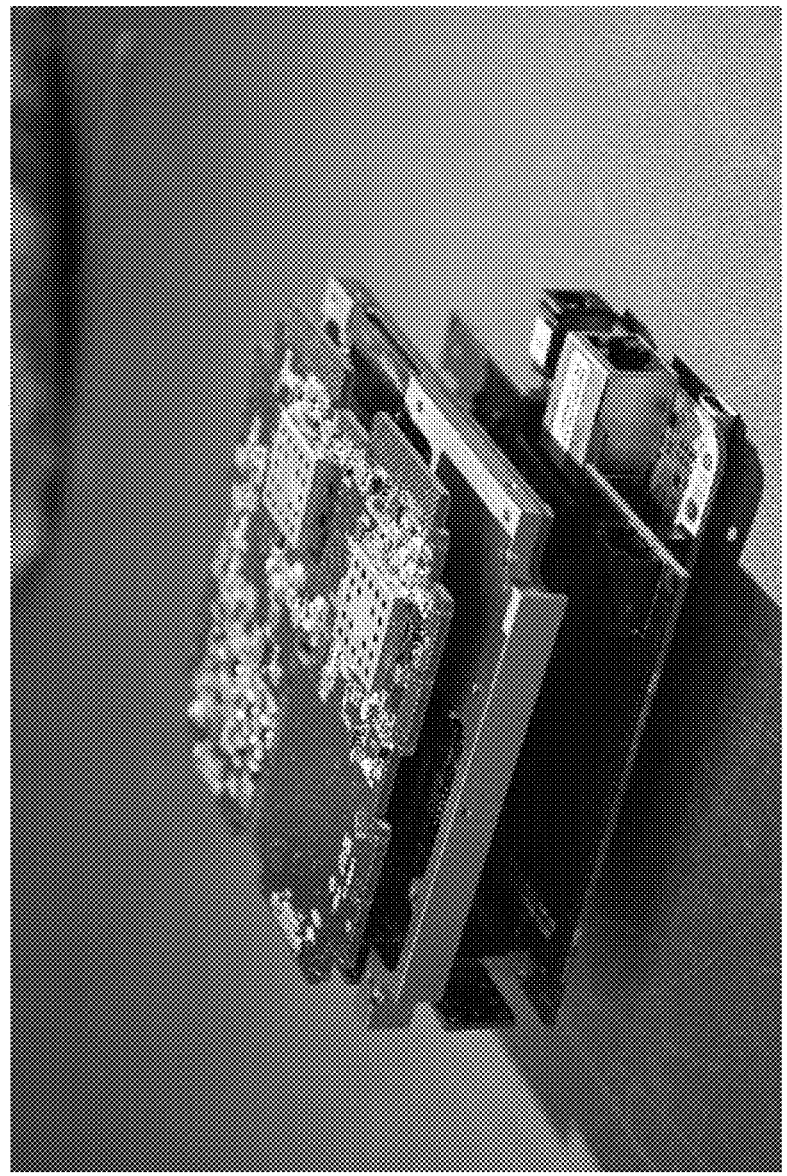
FIG. 14C is a photograph illustrating stacked boards of the field unit box, according to an embodiment of the present invention.

FIGS. 14A-C illustrate a closed and opened prototype field unit box 1400 and boards 1410 stacked within field unit box 1400, according to an embodiment of the present invention. Field unit box 1400 is compact and easily accessible once the case is opened.

Software

In some embodiments, orbit tracking software may provide tracking, rotor control, Doppler calculation, etc. A script may be provided for automatic two-line element (TLE) updates. The user interface may be relatively simple, with a graphical representation of space vehicle locations and ranges on a map. The user interface may also display satellite communications and provide logging. Conventional ground station software is complex and requires extensively trained, specialized users to operate. Moreover, conventional ground stations typically require an operator to be present, i.e., they do not support unattended operations. By contrast, some embodiments present a simple user interface, enabling non-expert users to task and operate the satellite quickly, and enable fully automated "lights-out" space vehicle operations, vastly lowering the cost and infrastructure required to operate the space vehicle system.

Figure 15:
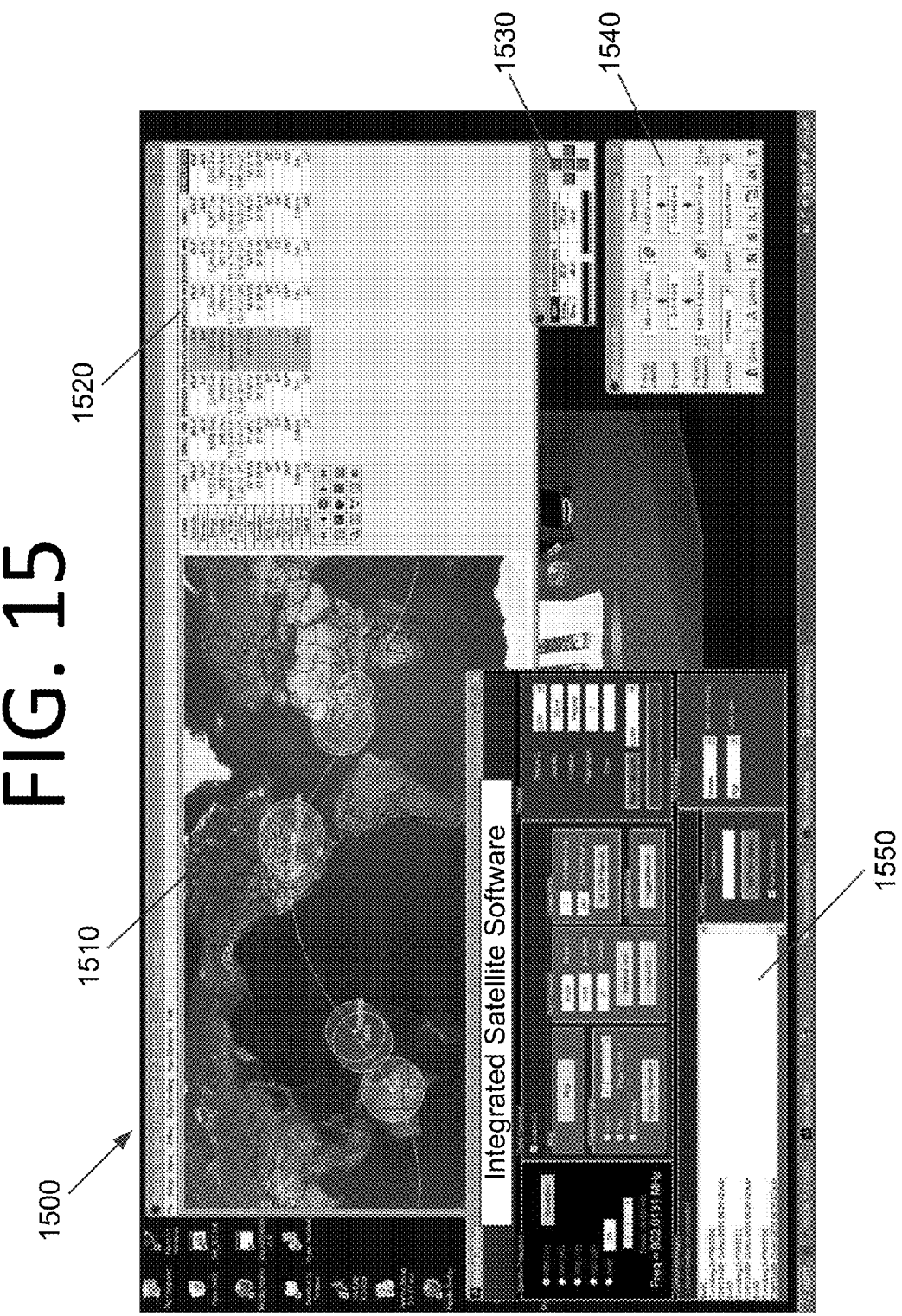
FIG. 15 is a screenshot illustrating ground station control software, according to an embodiment of the present invention.

FIG. 15 is a screenshot 1300 illustrating ground station control software, according to an embodiment of the present invention. The ground station control software includes a map 1510 that displays satellite positions relative to the Earth and ground footprints. A satellite selection panel 1520 allows a user to view data for various satellites, such as azimuth, elevation, range, height, etc. Selection panel 1520 also allows the user to select a satellite to control.

Figure 16:
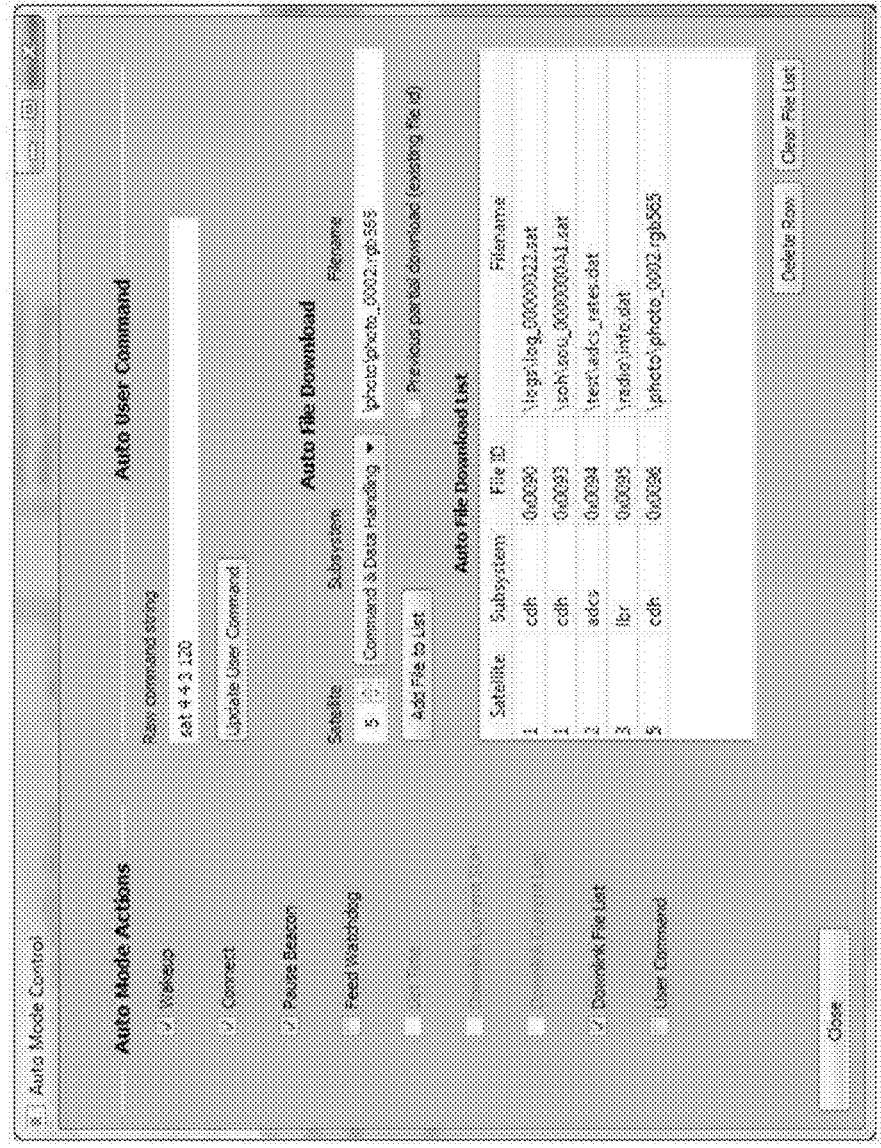
FIG. 16 is a screenshot illustrating simplified ground station control software, according to an embodiment of the present invention.

An azumith/elevation panel 1530 shows the azimuth and elevation for the selected satellite. A radio control panel 1540 shows the frequency at the satellite, Doppler shift, and transmit frequency for uplink and downlink. The uplink transmit frequency and downlink frequency at the satellite can also be controlled. A command interface 1550 allows the user to enter commands and also shows log data. In certain embodiments, all of the panels may be integrated into a single window. The control software may allow full control over the satellite and provide a large amount of diagnostic information. Simplified ground station software is illustrated in screenshot 1600 of FIG. 16.

Per the above, the field unit may not provide the user with the ability to control space vehicles or to communicate with space vehicles at all. The field unit may steam data to a computing system associated with the field unit and display the data in a graphical user interface (GUI). For example, the field unit software may enable the user to get certain data transmitted by the space vehicle, such as photos, video, audio, etc.

FIG. 17 is a block diagram 1700 illustrating connection setup for a ground station, space vehicle, and field unit system, according to an embodiment of the present invention. In this embodiment, ground station 1710 initiates a connection with space vehicle 1720. Space vehicle 1720 then initiates a connection with field unit 1730. Field unit 1730 cannot initiate connections in this embodiment. Proof of identity, key exchange, data encryption, and other security may be performed using known techniques (e.g., digital signature algorithm (DSA), station-to-station (STS) protocol, etc.).

Conventional space vehicle systems use FAT file systems or similar formats, using Internet Protocol (IP) or similar protocols for file transfer. In these systems, files are stored sequentially, and are similarly transferred sequentially. Specifically, for file transfer, the file is split into a set of datagrams that are assigned a sequence number and again transferred sequentially, using a retry protocol to re-send corrupted datagrams. This type of transfer protocol assumes a single sender and receiver (destination). A major disadvantage of this type of system is that it does not allow for files to be transmitted piecemeal, using multiple satellites to transfer different portions of the file.

To address this and other issues, some embodiments combine a number of different features of various file systems and transfer protocols to create a new, unique approach. Files may be split into datagrams as before, but a metadata header may be attached that contains the origin of the file, the file name, the sequence number, and other information to enable data transfer. These datagrams may be wholly self-contained, and may be transferred and stored individually on an ad-hoc basis. The sender may track which datagrams were successfully transferred, using an ack/retry protocol, without knowledge of the final destination. Intermediate nodes may then be used to store and eventually re-transmit this data as many times as needed until the data is finally gathered together and reassembled at the destination. The resulting system is a combination of a distributed file system and a transfer protocol that is uniquely suited to constellations of small satellites.

An advantage of this approach is that files can be transferred out of order and reassembled. Also, multiple space vehicles may transmit or receive different portions of a file. For instance, a first space vehicle may get a frame of an uplink file. Later, a second satellite may get several more frames, etc. This also works in the reverse direction with respect to the GS/FU. A satellite may transfer some fraction of frames to the first ground station it encounters, transfer more data to a second ground station, and so on. The file may become more and more fractionated, but all data is still present to eventually re-assemble the file at a final receiving node, without the ultimate sending and receiving nodes ever directly communicating with one another.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
at least one hardware board configured to enable operation of the apparatus as a field unit and a ground station, wherein
software controls whether the apparatus operates as a field unit or a ground station without physical modification to the at least one hardware board.

2. The apparatus of claim 1, wherein the at least one hardware board comprises:
an analog radio board configured to send and receive radio signals via an antenna;
a digital radio board configured to interface with the analog radio board and provide digital radio functionality;
a microcontroller board configured to provide processing for the apparatus; and
a backplane that connects the analog radio board, digital radio board, and microcontroller board, facilitating communication between the boards.

3. The apparatus of claim 1, wherein dimensions of the apparatus are approximately four inches by four inches by two inches (4×4×2).

4. The apparatus of claim 1, further comprising:
a universal serial bus (USB) port, an Ethernet port, a power port, an external antenna connector, or any combination thereof.

5. The apparatus of claim 1, further comprising:
a protective enclosure configured to provide protection from weather.

6. The apparatus of claim 1, further comprising:
a twisted pair cable port, a universal serial bus (USB) port, a general purpose input/output (GPIO) port, and an N-connector port configured to receive a radio frequency (RF) signal.

7. The apparatus of claim 1, wherein the software controlling whether the apparatus operates as a field unit or a ground station is stored on an external storage device that can be plugged into the apparatus, which then reads and executes the stored software.

8. The apparatus of claim 1, further comprising:
hardware configured to enable wired or wireless communication, wherein
the hardware downloads the software to enable operation of the apparatus as a field unit or a ground station.

9. The apparatus of claim 1, wherein encryption keys enabling security privileges on a per-user basis are stored on the apparatus and used by the software.

10. The apparatus of claim 1, wherein the apparatus is configured to be controlled by a local or remote external computer.

11. The apparatus of claim 1, wherein the apparatus is configured to control orientation of an antenna via a rotor control box, and to send data to and receive data from a space vehicle via a transceiver box.

12. The apparatus of claim 1, wherein the apparatus is attached to an antenna or integrated with a rotor of the antenna.

13. A field unit/ground station (FU/GS) box, comprising:
an analog radio board configured to send and receive radio signals via an antenna;
a digital radio board configured to interface with the analog radio board and provide digital radio functionality;
a microcontroller board configured to provide processing for the FU/GS box; and
a backplane that connects the analog radio board, digital radio board, and microcontroller board, facilitating communication between the boards, wherein
software controls whether the FU/GS box operates as a field unit or a ground station without physical modification to the boards.

14. The FU/GS box of claim 13, further comprising:
a protective enclosure configured to provide protection from weather.

15. The FU/GS box of claim 13, wherein the software controlling whether the FU/GS box operates as a field unit or a ground station is stored on an external storage device that can be plugged into the FU/GS box, which then reads and executes the stored software.

16. The FU/GS box of claim 13, further comprising:
hardware configured to enable wired or wireless communication, wherein
the hardware downloads the software to enable operation of the FU/GS box as a field unit or a ground station.

17. A system, comprising:
at least one field unit; and
at least one ground station, wherein
the at least one field unit and the at least one ground station have common hardware.

18. The system of claim 17, wherein software controls whether the at least one field unit and the at least one ground station operate as a field unit or a ground station.

19. The system of claim 17, wherein each of the at least one field unit and the at least one ground station comprises:
an analog radio board configured to send and receive radio signals via an antenna;
a digital radio board configured to interface with the analog radio board and provide digital radio functionality;
a microcontroller board configured to provide processing for the field unit or ground station; and
a backplane that connects the analog radio board, digital radio board, and microcontroller board, facilitating communication between the boards.

* * * * *